(12) United States Patent
Midha

(10) Patent No.: US 10,348,539 B1
(45) Date of Patent: Jul. 9, 2019

(54) CARRIER FREQUENCY OFFSET COMPENSATION CIRCUIT AND PROCESS FOR A COMMUNICATIONS RECEIVER

(71) Applicant: STMicroelectronics International N.V., Schiphol (NL)

(72) Inventor: Gagan Midha, Panipat (IN)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 15/919,745

(22) Filed: Mar. 13, 2018

(51) Int. Cl.
| | |
|---|---|
| *H04L 27/06* | (2006.01) |
| *H04L 27/16* | (2006.01) |
| *H04L 27/00* | (2006.01) |
| *H04L 27/14* | (2006.01) |
| *H04L 27/156* | (2006.01) |

(52) U.S. Cl.
CPC .......... *H04L 27/16* (2013.01); *H04L 27/0014* (2013.01); *H04L 27/142* (2013.01); *H04L 27/1563* (2013.01); *H04L 2027/0026* (2013.01)

(58) Field of Classification Search
CPC ... H04L 27/16; H04L 27/0014; H04L 27/142; H04L 27/1563; H04L 2027/0026
See application file for complete search history.

(56) References Cited

U.S. PATENT DOCUMENTS

| | | | |
|---|---|---|---|
| 6,642,797 B1 | 11/2003 | Luo et al. | |
| 8,411,797 B2 | 4/2013 | Suissa et al. | |
| 2005/0169408 A1* | 8/2005 | Kim | H04L 27/2659 375/343 |
| 2009/0207944 A1* | 8/2009 | Furman | H04L 7/042 375/329 |
| 2010/0158076 A1* | 6/2010 | Snlyely | H04B 1/7075 375/130 |
| 2010/0260291 A1* | 10/2010 | Hou | H04L 27/0014 375/319 |
| 2011/0103534 A1* | 5/2011 | Axnnon | H04J 11/0069 375/371 |
| 2011/0255394 A1* | 10/2011 | Zha | H04J 11/0069 370/203 |
| 2013/0195229 A1 | 8/2013 | Cheng et al. | |
| 2014/0321526 A1* | 10/2014 | Muppirisetty | H04L 27/0014 375/232 |
| 2016/0234761 A1* | 8/2016 | Chong | H04L 25/024 |
| 2017/0195151 A1 | 7/2017 | Chu et al. | |
| 2017/0195152 A1 | 7/2017 | Chu et al. | |

* cited by examiner

*Primary Examiner* — Syed Haider
(74) *Attorney, Agent, or Firm* — Crowe & Dunlevy

(57) ABSTRACT

A frequency demodulated signal includes a frequency modulation in time that is shifted by a DC level corresponding to a carrier frequency offset. A number of different frequency offsets are applied to the frequency demodulated signal to generate a corresponding number of offset frequency demodulated signals. Each offset frequency demodulated signal is correlated against a reference signal and a determination is made as to which correlation produces a highest correlation value. One offset frequency demodulated signal of the number of offset frequency demodulated signals is then selected for output as an offset corrected frequency demodulated signal. The selected signal is the one having the highest correlation value.

14 Claims, 4 Drawing Sheets

CARRIER FREQUENCY OFFSET COMPENSATION CIRCUIT AND PROCESS FOR A COMMUNICATIONS RECEIVER

TECHNICAL FIELD

The present invention relates to technology for carrier frequency offset compensation in a communications receiver circuit.

BACKGROUND

Frequency modulation schemes are well known in the art. One such scheme is a Gaussian frequency shift keying (GFSK) modulation where the digital information is transmitted through the corresponding variation of a discrete carrier frequency. For example, in a Bluetooth transmitter operating in an ideal environment absent noise and frequency offset, the transmit signal for a bit having a value of "1" has a frequency shift of +250 kHz (i.e., a positive shift) from the center frequency fc of the carrier, while the transmit signal for a bit having a value of "0" has a frequency shift of −250 kHz (i.e., a negative shift) from the center frequency fc of the carrier.

The receiver circuit in the above example is expecting the received modulated signal to be centered at the center frequency of the carrier for demodulation. However, mismatch between the transmitter and receiver may introduce a frequency offset error in the carrier frequency. As a result of this frequency offset error, the frequency demodulated waveform at the receiver exhibits in the baseband an average value for the frequency shifts which does not approach zero and is thus DC biased by a value corresponding to the magnitude of the frequency offset. For example, with a carrier frequency offset of +100 kHz, the frequency demodulated waveform at the receiver for the bit having the value of "1" will have a frequency shift of +350 kHz (from baseband) and the bit having the value of "0" will have a frequency shift of −150 kHz (from baseband). The DC bias in this example will have a positive voltage level.

The specification requirements for certain transceiver systems may permit some level of carrier frequency offset. For example, a known Bluetooth specification permits a carrier frequency offset of ±100 kHz. It is accordingly imperative for the receiver to include some form of carrier frequency offset compensation or removal technology that can handle the permitted ±100 kHz range in carrier frequency offset.

The Bluetooth link layer packet includes an eight-bit preamble field that is used by the receiver to perform a number of important tasks including frequency synchronization, symbol timing estimation, and automatic gain control (AGC) training. The preamble field is typically populated by a symbol (octet) formed of alternating logic bits (i.e., "10101010" or "01010101"). It is also known in the art to use the frequency demodulated preamble field data to detect a carrier frequency offset. Because of the alternating logic bits, the frequency demodulated waveform for the preamble, in the absence of a frequency carrier offset error, should exhibit in the baseband an average value of the frequency shifts that is substantially equal to zero (because there are an equal number of "1" and "0" bits in the symbol). If the average value is something other than zero, then it can be concluded that a frequency carrier offset error is present. The magnitude and sign of the corresponding DC bias in the frequency demodulated signal can be detected by filtering and is indicative of the magnitude and direction of the frequency carrier offset. The accuracy of this carrier frequency offset detection technique is improved if the analysis of the average value of the frequency shifts for the frequency demodulated waveform is performed over a plurality of preamble symbols.

As noted above, the preamble field is used for other purposes and this can introduce problems with achieving the carrier frequency offset detection. For example, the automatic gain control process must be performed prior to performing carrier frequency offset detection. To cater to the full range of the input radio frequency signal, multiple gains must be determined. The automatic gain control process itself can take the analysis of multiple demodulated preamble field symbols to complete, and the total length of time for this analysis may leave no room on the back side to perform the frequency carrier offset error analysis using multiple demodulated preamble fields. For low level signals, the automatic gain control process may be completed more quickly, but the latency introduced by the noise rejection process in digital filtering can be significant when a high number of blockers are considered and again little if any time may be left on the back side to perform the frequency carrier offset error analysis. In any event, it is noted that the fewer the number of frequency demodulated preamble field symbols that are made available for the frequency carrier offset error analysis, the lower the accuracy of the offset estimation.

There is accordingly a need in the art for an improved carrier frequency offset compensation technique that will address at least the foregoing problems and limitations of the conventional process for frequency carrier offset error analysis.

SUMMARY

In an embodiment, a circuit comprises: an input configured to receive a frequency demodulated signal comprising a frequency modulation in time that is shifted by a DC level corresponding to a carrier frequency offset; a plurality of frequency shifting circuits configured to apply a corresponding plurality of frequency offsets to the frequency demodulated signal to generate a corresponding plurality of offset frequency demodulated signals; a correlation circuit configured to correlate each offset frequency demodulated signal of the plurality of offset frequency demodulated signals against a reference signal; a maximum correlation detection circuit configured to determine which correlation performed by the correlation circuit produces a highest correlation value and generate a selection signal identifying one offset frequency demodulated signal of the plurality of offset frequency demodulated signals which has a highest correlation value; and a multiplexer circuit configured to receive the plurality of offset frequency demodulated signals, said multiplexer controlled by the selection signal to pass said one offset frequency demodulated signal of the plurality of offset frequency demodulated signals having the highest correlation value for output as an offset corrected frequency demodulated signal.

In an embodiment, a method comprises: receiving a frequency demodulated signal comprising a frequency modulation in time that is shifted by a DC level corresponding to a carrier frequency offset; applying a corresponding plurality of frequency offsets to the frequency demodulated signal to generate a corresponding plurality of offset frequency demodulated signals; correlating each offset frequency demodulated signal of the plurality of offset frequency demodulated signals against a reference signal;

determining which correlation produces a highest correlation value; and selecting one offset frequency demodulated signal of the plurality of offset frequency demodulated signals which has the highest correlation value for output as an offset corrected frequency demodulated signal.

BRIEF DESCRIPTION OF THE DRAWINGS

For a better understanding of the embodiments, reference will now be made by way of example only to the accompanying figures in which.

DETAILED DESCRIPTION

Figure 1:
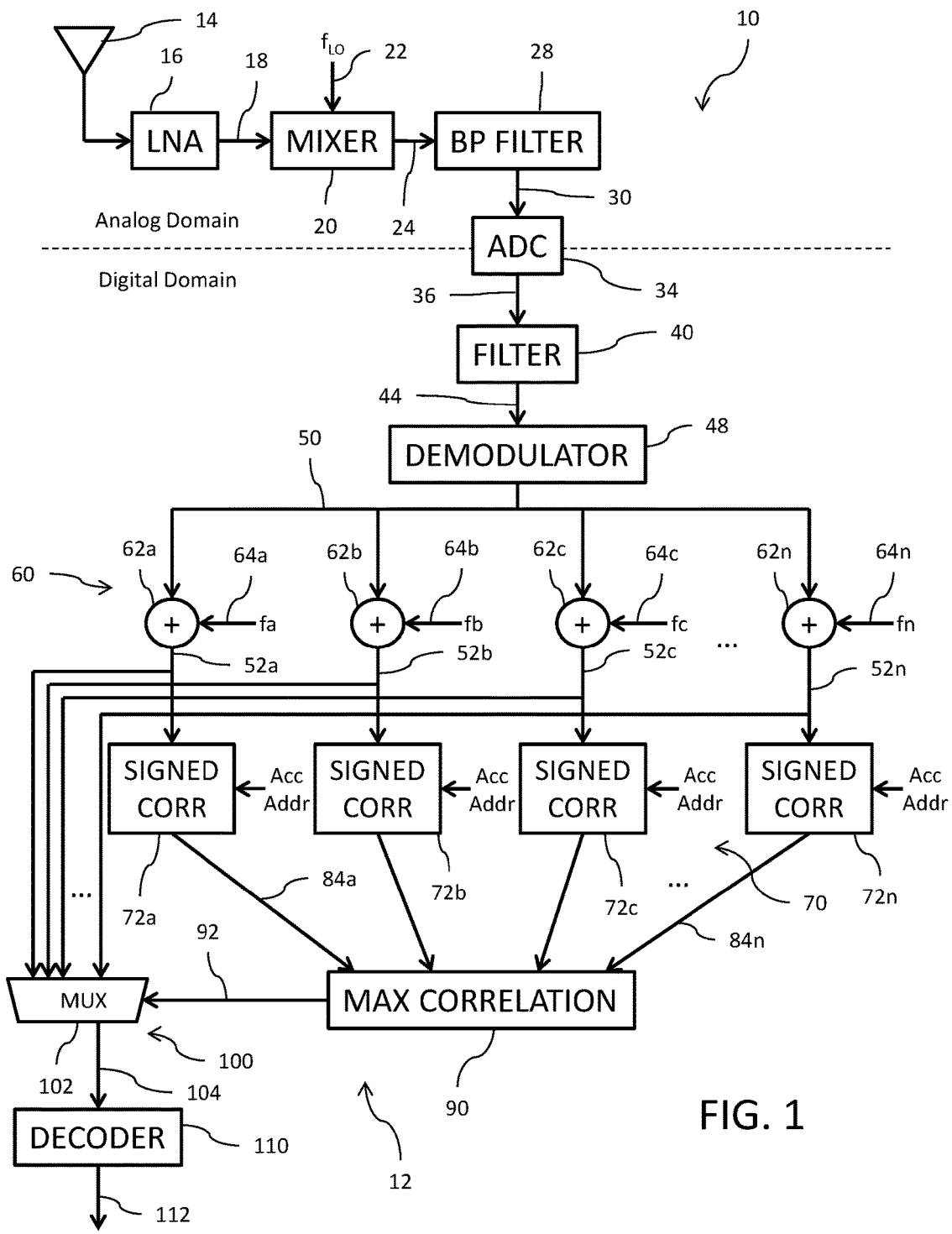
FIG. 1 is a block diagram of a communications receiver which includes a circuit for performing frequency carrier offset error estimation and correction.

Reference is now made to FIG. 1 which shows a block diagram of a communications receiver 10 that includes a circuit 12 for performing frequency carrier offset error estimation and correction.

Within the analog domain, the receiver 10 receives a frequency modulated RF signal at an antenna 14. The frequency modulated RF signal may, for example, comprise a GFSK modulated Bluetooth signal. The received frequency modulated RF signal is passed through a low noise amplifier 16 to generate an amplified RF signal 18. A frequency mixing circuit 20 mixes the amplified RF signal 18 with a local oscillator signal 22 to generate a downconverted signal 24 which comprises, for example, a low intermediate frequency signal (low-IF) or zero intermediate frequency signal (zero-IF) depending on the frequency relationship between the frequency $f_{LO}$ of the local oscillator signal 22 and a center frequency of the modulated RF signal. The downconverted signal 24 output from the frequency mixing circuit 20 is passed through a bandpass filter 28 (for example, a polyphase filter centered on the center frequency of the downconverted signal 24 and having a bandwidth generally corresponding to a channel width) to generate a filtered channel signal 30 for application to the input of an analog-to-digital converter (ADC) circuit 34 which operates to sample and digitize the filtered channel signal 30. In an implementation, the ADC circuit 34 oversamples the filtered channel signal 30 (for example, taking 24 samples of each symbol bit).

Figure 2A:
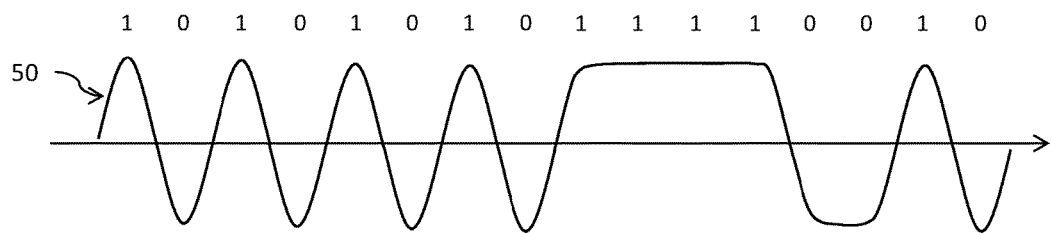
FIGS. 2A-2C show signal representations of the demodulated data signal with different carrier offsets.
Figure 2B:
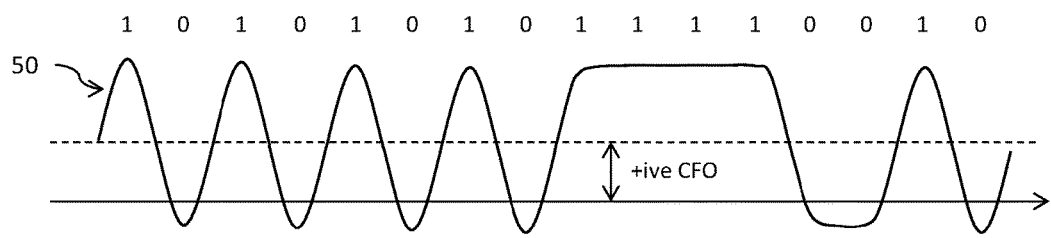
Figure 2C:
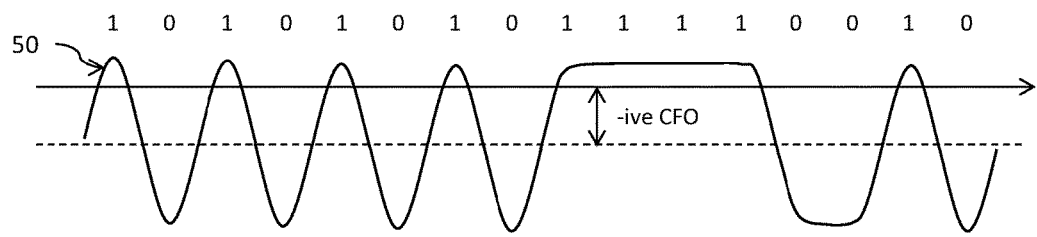

Now with respect to the digital domain, the ADC circuit 34 outputs a digital signal 36 to a low pass filter 40 (for example, of the infinite impulse response (IIR), bandpass or notch type). The filtered digital signal 44 output from the filter 40 is processed in a frequency demodulator 48 to generate a frequency demodulated data signal 50. Before frequency demodulation, the filtered digital signal 44 may be represented by $\sin(2\pi IFt+2\pi f\!\int\!\Delta f(t))$, where IF is the center (intermediate) frequency of the downconverted signal 24 and $\Delta f(t)$ is the Gaussian frequency shift keying modulation in time. After frequency demodulation is performed, the frequency demodulated data signal 50 may be represented by CFO+$\Delta f(t)$, where CFO is a DC voltage level corresponding to the carrier frequency offset between the frequency $f_{LO}$ of the local oscillator signal 22 and the center frequency of the modulated RF signal. FIG. 2A shows an example of the frequency demodulated data signal 50 with CFO=0 (i.e., no carrier frequency offset error), FIG. 2B shows the demodulated data signal 50 with CFO=+ive value (i.e., there is a positive carrier frequency offset error), and FIG. 2C shows demodulated data signal 50 with CFO=−ive value (i.e., there is a negative carrier frequency offset error). In FIGS. 2A-2C, the "1" and "0" designations indicate the corresponding logic values of the modulation data, and in this example show the beginning of the Bluetooth link layer packet data with the preamble field ("10101010") and the first symbol (octet) of the four symbol long access address (Acc Addr) field ("11110010").

The circuit 12 for performing frequency carrier offset error estimation includes a frequency carrier offset error estimation circuit 60. The frequency demodulated data signal 50 is processed by the frequency carrier offset error estimation circuit 60 which includes a plurality (for example, n) adders that are configured to each apply a different frequency offset (in magnitude and direction) to the demodulated data signal 50 to produce a corresponding plurality of offset demodulated data signals 52. For example, a first adder 62a is configured to apply a first frequency offset (fa) 64a to the demodulated data signal 50 to produce a first offset demodulated data signal 52a. A second adder 62b is configured to apply a second frequency offset 64b to the demodulated data signal 50 to produce a second offset demodulated data signal 52b. A third adder 62c configured to apply a third frequency offset 64c to the demodulated data signal 50 to produce a third offset demodulated data signal 52c. Lastly, an n-th adder 62n is configured to apply an n-th frequency offset 64n to the demodulated data signal 50 to produce an n-th offset demodulated data signal 52n. The n frequency offsets will have different magnitudes and directions, and preferably a same number of frequency offsets will be provided on the positive and negative sides of the zero offset position, and perhaps further include within the n frequency offsets one zero offset.

It will be understood that n can be any selected integer value dependent on the desired granularity of the offset detection. In an example where n=5, the first frequency offset 64a may be +100 kHz, the second frequency offset 64b may be +50 kHz, the third frequency offset 64c may 0 kHz, the fourth frequency offset 64d may be −50 kHz and the fifth frequency offset 64e may be −100 kHz. The magnitudes for the various frequency offsets may be selected in accordance with the application, and in particular in consideration of the frequency modulation scheme and parameters used to generate the modulated RF signal. The magnitudes and directions of the frequency offsets could, for example, be chosen to effectively cover the full range of likely frequency carrier offset errors. Such is the case in the foregoing example with respect to a Bluetooth signal where a ±100 kHz carrier frequency offset is permitted.

A correlation circuit 70 operates to correlate each offset demodulated data signal 52a-52n against a reference data signal. In a preferred implementation, the reference data signal is the known access address (Acc Addr) data and the correlation is made against the portion of the offset demodulated data signal 52 corresponding to the access address field of the Bluetooth link layer packet. It will be understood that this is just an example of what may be selected for the reference data signal. More generally, the reference signal has to be known to the receiver. The access address is one such field. The preamble is also known and could be used instead of, or in addition to, the access address. For example, if AGC and filtering is completed before the preamble finishes (assuming that the latency of the filtering has also been considered), some latter part of the preamble can also be used as part of the reference for correlation processing.

Figure 3A:
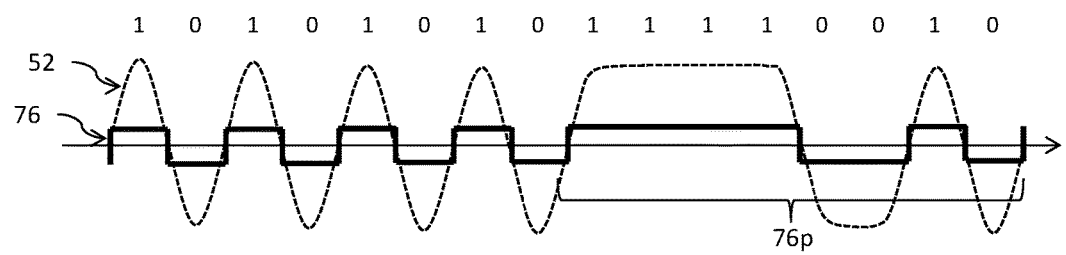
FIGS. 3A-3C show signal representations of the signed data signal corresponding to the demodulated data signal with different carrier offsets of FIGS. 2A-2C.
Figure 3B:
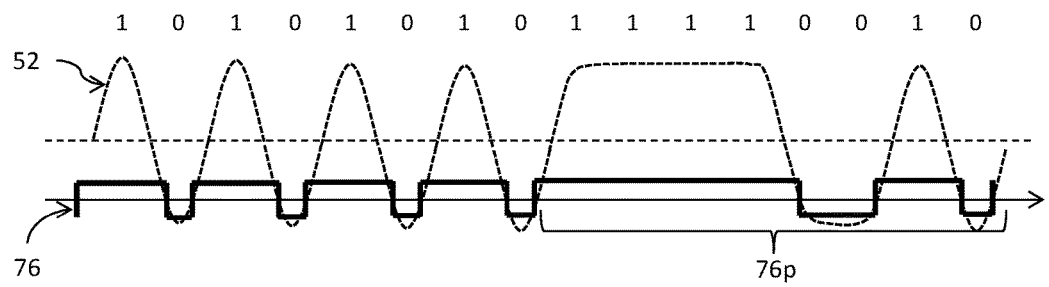
Figure 3C:
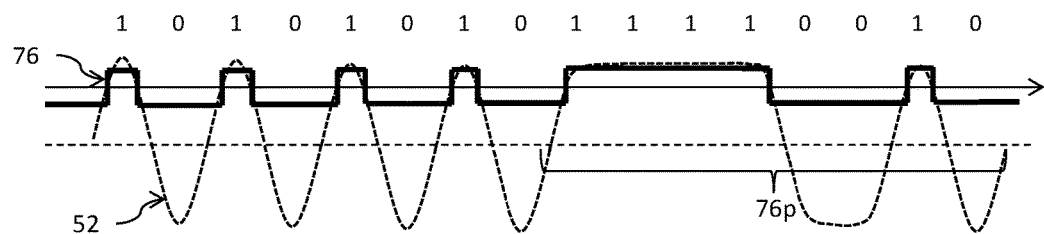

The correlation circuit 70 includes n correlators that operate to correlate each corresponding one of the offset demodulated data signals 52a-52n against the reference data signal. For example, a first correlator 72a correlates the first offset demodulated data signal 52a against the reference data signal, a second correlator 72b operates to correlate the second offset demodulated data signal 52b against the reference data signal, a third correlator 72c operates to correlate the third offset demodulated data signal 52c against the reference data signal, and an n-th correlator 72n operates to correlate the n-th offset demodulated data signal 52n against the reference data signal Each of the correlators 72 is preferably configured to implement a signed correlation technique. The correlator 72 receives the offset demodulated data signal 52 and generates a signed data signal 76 whose logic value corresponds solely to the sign of the offset demodulated data signal 52. So, if the offset demodulated data signal 52 has a positive value then the signed data signal 76 has a first logic value (for example, +1) and conversely if the offset demodulated data signal 52 has a negative value then the signed data signal 76 has a second logic value (for example, −1). FIGS. 3A-3C show the signed data signals 76 for examples of offset demodulated data signals 52 (generated, for example, from or corresponding to the demodulated data signals 50 of FIGS. 2A-2C), where the offset demodulated data signal 52 of FIG. 3A has no carrier frequency offset, the offset demodulated data signal 52 of FIG. 3B has a positive carrier frequency offset, and the offset demodulated data signal 52 of FIG. 3C has a negative carrier frequency offset.

Figure 4A:
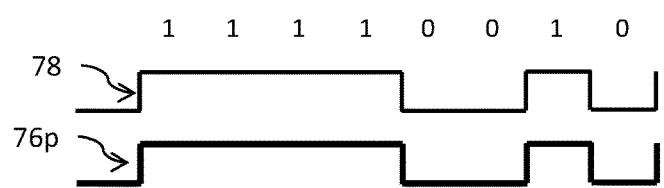
FIGS. 4A-4C show signal representations of the correlation process.
Figure 4B:
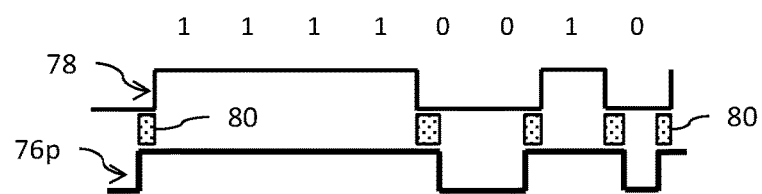
Figure 4C:
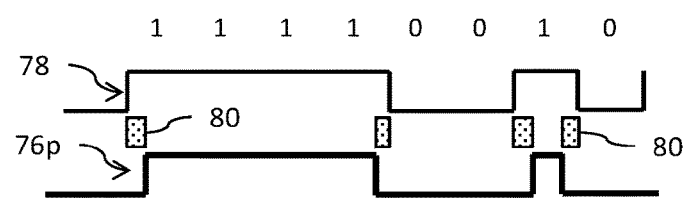

Each correlator 72 then correlates the signed data signal 76 to the reference data signal. In particular, the correlator operates to correlate the portion of the signed data signal 76 for the access address field of the Bluetooth link layer packet to the reference data signal for the known access address. FIGS. 4A-4C show the correlation comparison of the access address field portion 76p of the signed data signals 76 of FIGS. 3A-3C with the known access address 78. References 80 show locations where there is no correlation between the two signals. FIG. 4A illustrates a scenario with a very high correlation (approaching a scaled correlation value of 1) such as would exist where there is little to no carrier frequency offset as shown in FIGS. 2A and 3A. FIG. 4B illustrates a scenario with a lower correlation (for example, at a scaled correlation value of about 0.7) due to the +ive value of the carrier frequency offset as shown in FIGS. 2B and 3B. FIG. 4C illustrate another scenario with a lower correlation (for example, at a scaled correlation value of about 0.7) due to the −ive value of the carrier frequency offset as shown in FIGS. 2C and 3C. Each correlator 72 outputs a correlation signal 84 with a correlation value indicative of the degree of correlation of the signed data signal 76 to the reference data signal.

The correlation process illustrated in FIGS. 3A-3C and 4A-4C is presented with respect to only the first symbol (octet) of the demodulated signal for the access address field of the Bluetooth link layer packet. It will be understood, however, that the correlation process actually evaluates, at a minimum, all four symbols of the access address field of the Bluetooth link layer packet. In a preferred implementation, the correlation process is performed with respect to a plurality of consecutive Bluetooth link layer packets. Additionally, for the correlation process to be accurate there must exist a certain minimum number of transitions in the access address. The Bluetooth specification requires at least 7-8 transitions in the access address, which should be sufficient for the correlation process as disclosed herein to be effective for any Bluetooth signal and the link layer packet level.

As noted herein, the ADC circuit samples and digitizes the filtered channel signal 30. As an example, the sampling comprises an oversampling of the filtered channel signal 30 wherein each symbol bit is made up of 24 samples. The access address field of the Bluetooth link layer packet comprises four symbols (octets) and thus includes 32 bits. The correlation process performed by each correlator 72 is implemented as one long correlation of length 748 (i.e., 24 samples*32 bits). Each sample may be represented by an 8 bit 2's complement number. The correlation, however, does not require an 8 bit correlation over a 748 sample length (which is excessively complex and requires circuitry occupying a significant chip area). Instead, each correlator 72 takes only the sign of the demodulated data for correlation against the known access address. This signed correlation is much less complex and the required circuitry occupies significantly less chip area.

Reference is now once again made to FIG. 1. The frequency carrier offset error estimation circuit 60 further includes a maximum correlation detection circuit 90. The maximum correlation detection circuit 90 receives the signals 84a-84n with correlation values and determines which of the correlation values is the highest. A selection signal 92 is then generated by the maximum correlation detection circuit 90 based on the identification of the highest correlation value. The selection signal has a digital value that specifies which of the correlators 72a-72n detected the highest correlation between the received offset demodulated data signal 52 (i.e., the signed data signal 76) and the reference data signal.

The circuit 12 for performing frequency carrier offset error estimation further includes a frequency carrier offset error correction circuit 100. The frequency carrier offset error correction circuit 100 is formed by a multiplexer 102 having inputs coupled to receive the offset demodulated data signals 52a-52n. A control input of the multiplexer 102 receives the selection signal 92 output by the maximum correlation detection circuit 90. Responsive to the detected highest correlation, the selection signal 92 causes the multiplexer 102 to select one of the offset demodulated data signals 52a-52n, and in particular the particular one of the offset demodulated data signals 52a-52n which has the highest correlation to the reference data signal, for output as the offset corrected demodulated data signal 104.

The circuit 10 further includes decoder circuit 110 that receives and processes the offset corrected demodulated data signal 104 to decode and output a decoded data signal 112.

Operation of the circuit 12 may be better understood by reference to an example. Assume that the demodulated data signal 50 is perturbed by a carrier frequency offset of +100 kHz and that the n frequency offsets used within the frequency carrier offset error estimation circuit 60 include offsets fa=+100 kHz, fb=+50 kHz, fc=0 kHz, fd=−50 kHz and fn=−100 kHz. The adder 62a applies the frequency offset fa 64a to the demodulated data signal 50 to produce the first offset demodulated data signal 52a having a frequency offset of +200 kHz (+100 kHz+100 kHz). The adder 62b applies the frequency offset fb 64b to the demodulated data signal 50 to produce the second offset demodulated data signal 52b having a frequency offset of +150 kHz (+100 kHz+50 kHz). The adder 62c applies the frequency offset fc 64c to the demodulated data signal 50 to produce the third offset demodulated data signal 52c having a frequency offset of +100 kHz (100 kHz-0 kHz). The adder 62*d* applies the frequency offset fd 64*d* to the demodulated data signal 50 to produce the fourth offset demodulated data signal 52*d* having a frequency offset of +50 kHz (100 kHz-50 kHz). Lastly, the n-th adder 62*n* applies the n-th frequency offset fn 64*n* to the demodulated data signal 50 to produce the n-th offset demodulated data signal 52*n* having a frequency offset of 0 kHz (+100 kHz-100 kHz).

The correlation circuit 70 operates to correlate the offset demodulated data signals 52*a*-52*n* against the reference data signal. Because the n-th adder 62*n* with the n-th frequency offset fn 64*n* effectively cancels the carrier frequency offset of +100 kHz present in the demodulated data signal 50, the n-th offset demodulated data signal 52*n* will have a carrier frequency offset at or around 0 kHz and thus will be the most closely correlated one of the offset demodulated data signals 52 to the reference data signal and the signal 84*n* will have the highest correlation value among the signals 84*a*-84*n*. The maximum correlation detection circuit 90 detects this highest correlation value and generates the selection signal 92 having a digital value specifying that correlator 72*n* detected the highest correlation. The selection signal 92 with that value causes the multiplexer 102 to select the corresponding n-th offset demodulated data signal 52*n* (which had the highest correlation to the reference data signal) for output as the offset corrected demodulated data signal 104.

Now assume that the demodulated data signal 50 is perturbed by a carrier frequency offset of −65 kHz and that the n frequency offsets used within the frequency carrier offset error estimation circuit 60 include offsets fa=+100 kHz, fb=+50 kHz, fc=−50 kHz and fn=−100 kHz. The adder 62*a* applies the frequency offset fa 64*a* to the demodulated data signal 50 to produce the first offset demodulated data signal 52*a* having a frequency offset of +35 kHz (−65 kHz+100 kHz). The adder 62*b* applies the frequency offset fb 64*b* to the demodulated data signal 50 to produce the second offset demodulated data signal 52*b* having a frequency offset of −15 kHz (−65 kHz+50 kHz). The adder 62*c* applies the frequency offset fc 64*c* to the demodulated data signal 50 to produce the third offset demodulated data signal 52*c* having a frequency offset of −65 kHz (−65 kHz-0 kHz). The adder 62*d* applies the frequency offset fd 64*d* to the demodulated data signal 50 to produce the fourth offset demodulated data signal 52*d* having a frequency offset of −115 kHz (−65 kHz-50 kHz). Lastly, the n-th adder 62*n* applies the n-th frequency offset fn 64*n* to the demodulated data signal 50 to produce the n-th offset demodulated data signal 52*n* having a frequency offset of −165 kHz (−65 kHz-100 kHz).

The correlation circuit 70 operates to correlate the offset demodulated data signals 52*a*-52*n* against the reference data signal. Because the second adder 62*b* with the second frequency offset fb 64*b* most nearly cancels the carrier frequency offset of −65 kHz present in the demodulated data signal 50, the second offset demodulated data signal 52*b* will have a carrier frequency offset at or around −15 kHz and thus will be the most closely correlated one of the offset demodulated data signals 52 to the reference data signal and the signal 84*b* will have the highest correlation value among the signals 84*a*-84*n*. The maximum correlation detection circuit 90 detects this highest correlation value and generates the selection signal 92 having a digital value specifying that correlator 72*n* detected the highest correlation. The selection signal 92 with that value causes the multiplexer 102 to select the corresponding n-th offset demodulated data signal 52*n* (which had the highest correlation to the reference data signal) for output as the offset corrected demodulated data signal 104.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A circuit, comprising:
    an input configured to receive a frequency demodulated signal comprising a frequency modulation in time that is shifted by a direct current (DC) level corresponding to a carrier frequency offset;
    a plurality of frequency shifting circuits configured to apply a corresponding plurality of frequency offsets to the frequency demodulated signal to generate a corresponding plurality of offset frequency demodulated signals;
    a correlation circuit configured to correlate each offset frequency demodulated signal of the plurality of offset frequency demodulated signals against a reference signal;
    a maximum correlation detection circuit configured to determine which correlation performed by the correlation circuit produces a highest correlation value and generate a selection signal identifying one offset frequency demodulated signal of the plurality of offset frequency demodulated signals which has said highest correlation value; and
    a multiplexer circuit configured to receive the plurality of offset frequency demodulated signals, said multiplexer controlled by the selection signal to pass said one offset frequency demodulated signal of the plurality of offset frequency demodulated signals having the highest correlation value for output as an offset corrected frequency demodulated signal.

2. The circuit of claim 1, wherein the correlation circuit is further configured to generate a signed data signal for each offset frequency demodulated signal of the plurality of offset frequency demodulated signals, and wherein the correlation comprises a correlation of each signed data signal against the reference signal.

3. The circuit of claim 2, wherein the signed data signal has a positive sign if a sign of the offset frequency demodulated signal is positive and has a negative sign if the sign of the offset frequency demodulated signal is negative.

4. The circuit of claim 1, wherein the frequency demodulated signal is derived from a received Bluetooth signal and wherein the offset frequency demodulated signal corresponds to an access address field portion of a Bluetooth link layer packet and wherein the reference signal is access address data.

5. The circuit of claim 1, further comprising a decoder circuit configured to receive and decode the offset corrected frequency demodulated signal.

6. The circuit of claim 1, further comprising:
    a mixer circuit configured to mix a received radio frequency (RF) frequency modulated signal with a local oscillator signal to generate a downconverted signal;
    an analog-to-digital converter circuit configured to sample and digitize the downconverted signal for output as a digital signal; and a frequency demodulator configured to frequency demodulate the digital signal to generate the frequency demodulated signal.

7. The circuit of claim 6, wherein the carrier frequency offset is an offset between a frequency of the local oscillator signal and a carrier frequency of said RF frequency modulated signal.

8. A method, comprising:
    receiving a frequency demodulated signal comprising a frequency modulation in time that is shifted by a direct current (DC) level corresponding to a carrier frequency offset;
    applying a corresponding plurality of frequency offsets to the frequency demodulated signal to generate a corresponding plurality of offset frequency demodulated signals;
    correlating each offset frequency demodulated signal of the plurality of offset frequency demodulated signals against a reference signal;
    determining which correlation produces a highest correlation value; and
    selecting one offset frequency demodulated signal of the plurality of offset frequency demodulated signals which has the highest correlation value for output as an offset corrected frequency demodulated signal.

9. The method of claim 8, wherein correlating comprises:
    generating a signed data signal for each offset frequency demodulated signal of the plurality of offset frequency demodulated signals; and
    correlating each signed data signal against the reference signal.

10. The method of claim 9, wherein the signed data signal has a positive sign if a sign of the offset frequency demodulated signal is positive and has a negative sign if the sign of the offset frequency demodulated signal is negative.

11. The method of claim 8, wherein the frequency demodulated signal is derived from a received Bluetooth signal and wherein the offset frequency demodulated signal corresponds to an access address field portion of a Bluetooth link layer packet and wherein the reference signal is access address data.

12. The method of claim 8, further comprising decoding the offset corrected frequency demodulated signal.

13. The method of claim 8, further comprising:
    mixing a received radio frequency (RF) frequency modulated signal with a local oscillator signal to generate a downconverted signal;
    sampling and digitizing the downconverted signal for output as a digital signal; and
    frequency demodulating the digital signal to generate the frequency demodulated signal.

14. The method of claim 13, wherein the carrier frequency offset is an offset between a frequency of the local oscillator signal and a carrier frequency of said RF frequency modulated signal.

* * * * *